No. 878,256. PATENTED FEB. 4, 1908.
W. H. THORNE.
CENTRIFUGAL PUMP.
APPLICATION FILED AUG. 23, 1907.
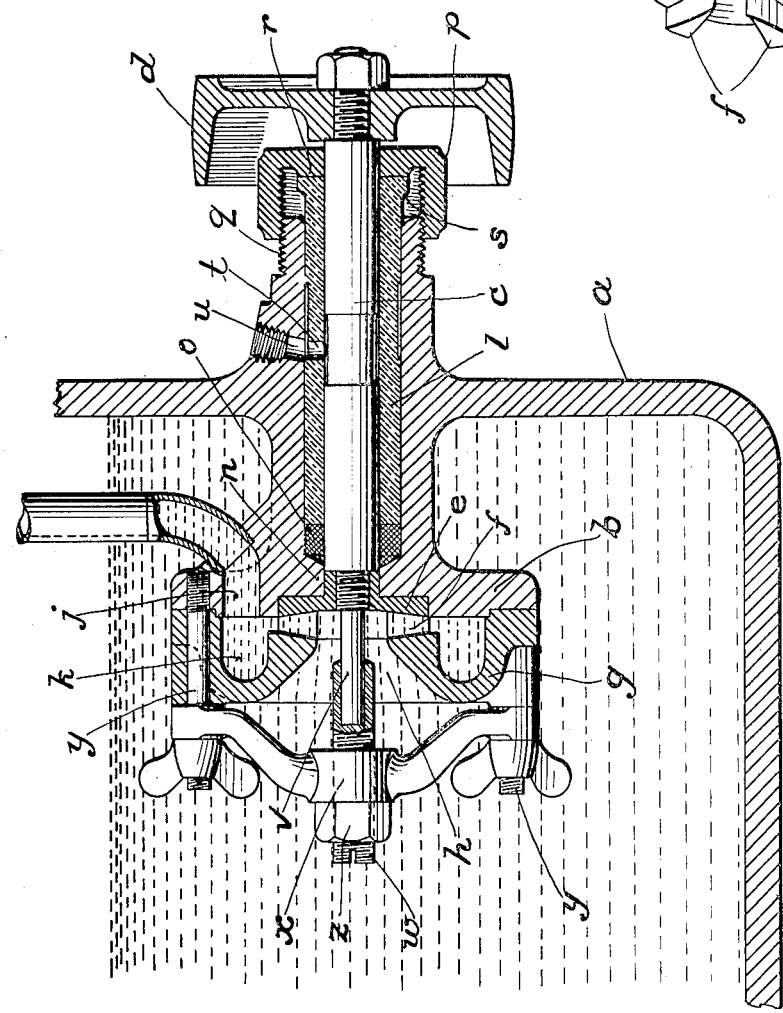
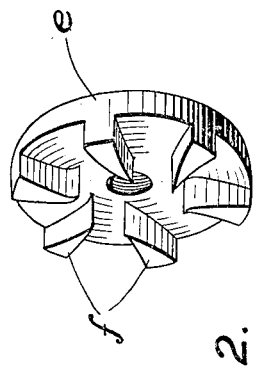
WITNESSES:
Robt R Ketchie
E. E. Wall
INVENTOR
William H. Thorne
BY
Harding & Harding
ATTORNEYS.

UNITED STATES PATENT OFFICE.

WILLIAM H. THORNE, OF MOUNT AIRY, PENNSYLVANIA, ASSIGNOR TO WILLIAM SELLERS AND COMPANY, INCORPORATED, OF PHILADELPHIA, PENNSYLVANIA, A CORPORATION OF PENNSYLVANIA.

CENTRIFUGAL PUMP.

No. 878,256.  Specification of Letters Patent.  Patented Feb. 4, 1908.

Application filed August 23, 1907. Serial No. 389,769.

*To all whom it may concern:*

Be it known that I, WILLIAM H. THORNE, a citizen of the United States, residing at Mount Airy, county of Philadelphia, and State of Pennsylvania, have invented a new and useful Improvement in Centrifugal Pumps, of which the following is a full, clear, and exact description, reference being had to the accompanying drawings, which form a part of this specification.

My invention relates to centrifugal pumps and particularly to small pumps of this character which are used for conveying water or other fluids for cooling or lubricating the bearings of machinery or cutting tools or grinding wheels. Such pumps work best when immersed below the surface of the fluid to be lifted. It is generally most convenient to drive such pumps from a horizontal shaft as then no change in the direction is necessitated. With the class of machines with which my centrifugal pump is designed to be used, there is a considerable amount of grit in the water, which, if the ordinary construction and a horizontal drive be used, will result, when the water is forced around the shaft, in causing the shaft to be cut and abraded. Hence, in the ordinary construction of this type of pumps, the pump shaft is vertical and the change of direction is obtained by means of bevel gears or carrier pulleys.

It is the object of my invention to provide a construction in which the pump shaft is horizontal and yet no liquid is allowed to escape from the tank through the shaft opening, and thus around the shaft—at the same time to provide a bearing for the pump shaft practically throughout the entire length of the shaft. I also provide means whereby the shaft may be effectually lubricated. These and certain details of construction, to prevent the lateral movement of the shaft, form the objects of my invention. Speaking generally, I accomplish these results as follows: The pump shaft is provided throughout practically its entire length with a gland movable longitudinally of the shaft. Between the pump end of this shaft and a flange on the pump casing is interposed a packing which makes a fluid-tight joint. The gland is moved longitudinally and the packing forced against the casing by a screw cap. Through this gland I provide an oiling orifice or orifices and through the casing leading to these oiling orifices I provide oiling channels.

The construction whereby the shaft is held from longitudinal movement will more readily be seen by reference to the embodiment of my invention illustrated in the drawings.

In the drawings illustrating an embodiment of my invention, Figure 1 is a sectional view showing a pump immersed in the fluid. Fig. 2 is an enlarged perspective view of the pump disk and vanes.

$a$ is the tank containing the fluid in which the pump is submerged.

$b$ is the pump casing, $c$ the pump shaft, $d$ the driving pulley for the same. The end of the shaft $c$ opposite the pulley is reduced and threaded.

$e$ is the pump disk having the vanes $f$. The hub of the disk $e$ has an orifice which is threaded and by means of which the disk is secured upon the threaded end of the shaft.

The pump disk is inclosed with a cover $g$, having a central aperture $h$, through which the fluid passes to the disk. The cover $g$ is secured by bolts $y$ to the casing $b$, so that there is formed a closed box for the pump having the aperture $h$ for the admission of the fluid and the outlet $j$ through which, by the disk vanes, the fluid is forced to the point where it is to be used. With the construction thus described, when the pump is in action, the fluid in the outlet $j$ and in the receiving chamber $k$ in the cover $g$ is under pressure. Being under pressure, the fluid tends to escape, around the outside of the disk $e$ and along the bearing of the shaft $c$. As the fluid, with the specific uses of my pump, contains grit and other abrading material the shaft becomes abraded. It is this difficulty which has heretofore caused the pump to be placed vertically, necessitating the use of bevel gears or carrier pulleys. In the construction of this invention I provide a long gland $t$ which surrounds the shaft $c$ and forms a bearing for the shaft throughout practically its entire length. Between the inner end of this gland and a flange $n$ on the pump casing $b$, forming an abutment, I interpose a packing $o$. This packing may be of leather, flax or other suitable material. $p$ is a screw cap working on a threaded hub $q$ from the casing $b$. This screw cap has a face $r$ which is in line with the outer end of gland $l$. By turning this screw cap in one direction the gland is moved longitudinally and the packing compressed against the flange n and prevents the passage of the fluid to the shaft. By turning the screw cap in the other direction, the compression of the packing is released and the gland may be moved longitudinally, in the other direction, the projection s thereon facilitating this movement, and the cap and gland can be removed for the purpose of renewing the packing.

Through the gland is the oil orifice t, although I do not intend to limit myself to one such orifice, and through the casing is the oil passage or hole u communicating with an annular space t' of sufficient length to compensate for the different positions of the gland.

I have found in practice that since there is a greater pressure in the outlet j and chamber k than at the opening or aperture h, the fluid passing behind the disk e will tend to move it toward the cap or cover g until the vanes come in contact with the conical surface of such cap or cover. When this occurs the vanes wear away with considerable rapidity. In my invention I obviate this in the following manner: v is a cylinder preferably of hardwood of a suitable character, for instance, lignum-vitæ. This cylinder is carried on the end of a screw w which passes through a threaded orifice in the cross-bar x, secured by the bolts y to the casing. By turning the screw w the inner end of the cylinder v will contact with the shaft in the hub of the disk and prevent the disk moving toward the cover. By means of the jam nut z the cylinder v may be maintained in the desired position, after adjustment or readjustments, to accommodate for wear. Thus the shaft is prevented from longitudinal movement in that direction.

By the invention described, I prevent the passage of the fluid to the shaft and the cutting or abrading which would occur if it did so pass. I thus avoid, with the uses for which my pump is designed, the necessity of using a vertical pump shaft with its required means to change direction and can use a horizontal shaft. Further, I provide a bearing for substantially the entire shaft, the only portion not having such bearing is at the point where the packing is situated, which is negligible. Further, I can readily oil the shaft. Finally, I prevent any inward movement of the disk and the consequent wearing of the vanes.

Having now fully described my invention, what I claim and desire to protect by Letters Patent is:

1. In a centrifugal pump of the character described, the combination with the disk and its driving shaft, of a movable stop in the water chamber of the pump on the inlet side of the disk and in line with the axis of the disk, and means to adjust the position of said stop.

2. In a centrifugal pump of the character described, the combination with the cover forming the water chamber, the disk and its driving shaft, of a movable stop in the water chamber of the pump in line with the axis of the disk and between the disk and the cover, and means to adjust the position of said stop.

3. In a centrifugal pump of the character described, the combination with the disk and its driving shaft, of a cylinder in the water chamber of the pump and in line with the axis of the disk, a screw to which said cylinder is secured, a fixed bar having a threaded orifice in which said screw works.

4. In a centrifugal pump of the character described, the combination with the disk and its driving shaft, of a cylinder in the water chamber of the pump and in line with the axis of the disk, a screw to which said cylinder is secured, a fixed bar having a threaded orifice in which said screw works, and means to lock said screw from rotation.

5. In a centrifugal pump of the character described, the combination with the disk and its driving shaft, of a cylinder in the water chamber of the pump and in line with the axis of the disk, a screw to which said cylinder is secured, a fixed bar having a threaded orifice in which said screw works, and a jam nut to lock said screw from rotation.

In testimony of which invention, I have hereunto set my hand.

WM. H. THORNE.

Witnesses:
ROBT. T. BICKNELL,
E. E. WALL.